(12) United States Patent
Groskreutz

(10) Patent No.: US 7,077,404 B2
(45) Date of Patent: Jul. 18, 2006

(54) DEVICE TO MOVE HEAVY ITEMS

(76) Inventor: Donald A. Groskreutz, 464 Cree Ct., Lyons, CO (US) 80540

( * ) Notice: Subject to any disclaimer, the term of this patent is extended or adjusted under 35 U.S.C. 154(b) by 227 days.

(21) Appl. No.: 10/713,040

(22) Filed: Nov. 17, 2003

(65) Prior Publication Data

US 2004/0094921 A1    May 20, 2004

Related U.S. Application Data

(60) Provisional application No. 60/426,419, filed on Nov. 15, 2002.

(51) Int. Cl.
*B62B 1/18* (2006.01)
(52) U.S. Cl. .................. 280/47.31; 280/47.23
(58) Field of Classification Search ............ 280/47.17, 280/47.23, 47.3, 47.31, 47.32, 47.33, 47.331, 280/78, 79.11, 79.3
See application file for complete search history.

(56) References Cited

U.S. PATENT DOCUMENTS

| | | | |
|---|---|---|---|
| 1,804,403 A | | 5/1931 | Dowling |
| 2,492,157 A | | 12/1949 | LaRiviere ..................... 280/52 |
| 2,660,446 A | * | 11/1953 | Edhardt ....................... 280/653 |
| 3,236,537 A | * | 2/1966 | Eckman .................... 280/47.18 |
| 3,279,810 A | | 10/1966 | Ashworth .................. 280/47.3 |
| 3,870,367 A | | 3/1975 | O'Brien ....................... 298/1 B |
| 4,147,369 A | * | 4/1979 | Simpson ....................... 280/30 |
| 4,253,677 A | * | 3/1981 | Wissler ........................ 280/40 |
| 5,190,351 A | | 3/1993 | Klumpjan ....................... 298/3 |
| 5,242,177 A | * | 9/1993 | Morris ..................... 280/47.31 |
| 5,318,315 A | | 6/1994 | White et al. .............. 280/47.26 |
| 5,346,232 A | * | 9/1994 | Bushon ................... 280/47.31 |
| 5,415,421 A | | 5/1995 | Godwin ................... 280/47.31 |
| 5,752,473 A | * | 5/1998 | De Roovere ................ 119/728 |
| 6,203,033 B1 | * | 3/2001 | Knoll .......................... 280/47.3 |

FOREIGN PATENT DOCUMENTS

| | | | | |
|---|---|---|---|---|
| EP | 1 106 471 A1 | * | 6/2001 | |
| FR | 1.157.626 | * | 6/1958 | .............. 280/47.32 |
| GB | 158724 | | 11/1919 | |
| GB | 2 233 612 A | * | 1/1991 | |
| GB | 2315048 | | 1/1998 | |
| GB | 2363099 | | 12/2001 | |

* cited by examiner

*Primary Examiner*—Frank Vanaman
(74) *Attorney, Agent, or Firm*—Richard C. Litman

(57) ABSTRACT

A device to move heavy items made up of a substantially flat rectangular body used to carry heavy items, a handle assembly with two handles perpendicularly attached to an H-shaped handle stand that is perpendicularly attached to the proximal end of the substantially flat rectangular body. A sling is provided on each handle of the handle assembly to hold long and awkward items extending from the substantially flat rectangular body. A wheel positioned at the distal end and center of the substantially flat rectangular body is also provided to facilitate movement of the device and a cowl above and around the wheel, having an open front to allow the wheel to extend beyond the cowl and the substantially flat rectangular body.

8 Claims, 3 Drawing Sheets

DEVICE TO MOVE HEAVY ITEMS

CROSS-REFERENCE TO RELATED APPLICATION

This application claims the benefit of U.S. Provisional Patent Application Ser. No. 60/426,419, filed Nov. 15, 2002.

BACKGROUND OF THE INVENTION

1. Field of the Invention

The present invention relates to moving items about, and more specifically, to a wheelbarrow-like device to move heavy items.

2. Description of Related Art

Wheelbarrows have been used as far back as the advent of the wheel back to the Stone Age. Many improvements and changes have been implemented into the ordinary wheelbarrow over time. However, even the most improved ordinary wheelbarrow may still have room for improvements. Many of the previous and up-to-date improvements are reflected in the related art.

U.S. Pat. No. 1,804,403 issued to Dowling on May 12, 1931, outlines the use of a loading wheelbarrow with a frame and a body being movable like a scoop. The wheelbarrow is moved into an upright position and the body can be swung about a rear pivot away from the frame. The frame rests on auxiliary wheels, permitting the wheelbarrow to open and to be run along the ground at the base of a pile for gathering all the material into the pile.

U.S. Pat. No. 2,492,157 issued to Riviere on Dec. 27, 1949, outlines the use of a steering mechanism for transporting a vehicle such as a wheelbarrow, where the vehicle may be steered in order to make turns without requiring lateral swinging movement of the vehicle.

U.S. Pat. No. 3,279,810 issued to Ashworth on Oct. 18, 1966, outlines the use of a dual-purpose attachment for existing mason' wheelbarrows that include an attachment frame for mounting the dual purpose attachment on the wheelbarrow frame. There is also a pair of spaced members on the attachment frame projecting therefrom for engagement with brick bundles and a removable vertically extending wall portion supported by the spaced members, for carrying loose rocks and other similar types of items.

U.S. Pat. No. 3,870,367 issued to O'Brien on Mar. 11, 1975, outlines the use of a superstructure which is detachably affixed to an ordinary wheelbarrow with four elongated support poles which are clamped to the sloping sides of the wheelbarrow. A basket-shaped net having sloping sides is affixed to the upper portions of the support poles and has a greater volumetric capacity at upper portions relative to lower portions, thereby converting an ordinary wheelbarrow into a vehicle having a high volume capacity for carrying bulky items such as leaves or trash.

U.S. Pat. No. 5,190,351 issued to Klumpjan on Mar. 2, 1993, outlines the use of a wheelbarrow with an enlarged wheel and a low center of gravity for transporting heavy loads. The enlarged wheel and low center of gravity increases the stability of the wheelbarrow. The wheelbarrow includes a payload bucket, which is tiltable for dumping the payload. The bucket is mounted such that the dumping operation is behind the wheel of the wheelbarrow, whereby the dumping operation can be completed without substantially altering the center of gravity of the wheelbarrow, further enhancing the stability of the wheelbarrow when transporting heavy loads.

U.S. Pat. No. 5,318,315 issued to White et al. on Jun. 7, 1994, outlines the use of a portable wheeled cart for work in yard and garden, which includes a body having a bottom wall and a pair of opposing sidewalls extending upwardly from the bottom wall. The sidewalls include a plurality of open-ended passageways defined therein for receiving the handles of yard tools. In the wheelbarrow position, the yard tools and supplies can be readily transported from one location to another without requiring repeated trips between locations.

U.S. Pat. No. 5,415,421 issued to Godwin on May 16, 1995, outlines the use of a tray device for a wheelbarrow with a bottom surface, a front wall, rear walls and side walls forming an open top. The open top forms a trapezoid having an area greater than the area of the bottom surface, the side walls each forming a trapezium having all sides of unequal length and mounting supports for securing the device to a wheelbarrow when positioned between a pair of wheelbarrow shafts.

Great Britain Pat. No. 158,724 granted to Woods on Nov. 17, 1919, outlines the use of a wheelbarrow whose sides can be lowered outwardly to a level with the floor and whose sides can in some cases be completely detached. The wheelbarrow is specially adapted for carrying trusses of straw and hay, manure, hampers and other material from orchards, fields, roads and other surfaces.

Great Britain Pat. No. 2,315,048 granted to Kempsell et al. on Jan. 21, 1998, outlines the use of a wheelbarrow design with a rotating mountable bucket releasably secured and pivoted at its balance point to a tubular frame which embodies wheels, brakes and a locking mechanism to stop the bucket from rotating when lifting and moving loads. There is also a pulley system to facilitate the rotation of the bucket when emptying loose loads such as sand or stones. A bar allows a user to impart a levered force using his body weight and gravity alone on the load, with a fulcrum also being formed at the axles.

Great Britain Pat. No. 2,363,099 granted to Roddom on Dec. 12, 2001, outlines the use of a wheelbarrow having a main frame with at least one wheel at its forward end and handles at the opposite end. The body of the wheelbarrow is pivotally mounted at its forward end to the main frame so that it may be tipped to discharge a load contained in the wheelbarrow body without tipping the main frame. A sub-frame may be pivotally attached to the main frame to the rear of the wheel axle so as to provide a tipping handle attached to the forward end of the wheelbarrow body and extending to its rear, where it may form a U-shaped handle.

Although each of the discussed patents outline wheelbarrow devices that are novel and useful, what is really needed are some wheelbarrow features that more easily enable a user to carry lengthy and more awkward items with a wheelbarrow. Such features for a wheelbarrow would be welcomed into the marketplace for the broad range of users of wheelbarrows.

None of the above inventions and patents, taken either singly or in combination, is seen to describe the instant invention as claimed.

SUMMARY OF THE INVENTION

The invention is a device to move heavy items made up from a substantially flat rectangular body used to carry heavy items and a handle assembly with two handles perpendicularly attached to an H-shaped handle stand that is perpendicularly attached to the proximal end of the substantially flat rectangular body. A sling is provided on each handle of the handle assembly to hold long and awkward items extending from the substantially flat rectangular body. A wheel positioned at the distal end and center of the substantially flat rectangular body is also provided to facilitate movement of the device and a cowl above and around the wheel, having an open front to allow the wheel to extend beyond the cowl and the substantially flat rectangular body.

Accordingly, it is a principal object of the invention to provide a wheelbarrow that is easier to use over rough terrain than a conventional wheelbarrow.

It is another object of the invention to provide a wheelbarrow that can more easily carry lengthy and awkward material than a conventional wheelbarrow.

It is a further object of the invention to provide a wheelbarrow that can be tilted and easier to load than a conventional wheelbarrow.

Still another object of the invention is to provide a wheelbarrow with a wheel that is situated forward of the body of the wheelbarrow to produce a more maneuverable wheelbarrow.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
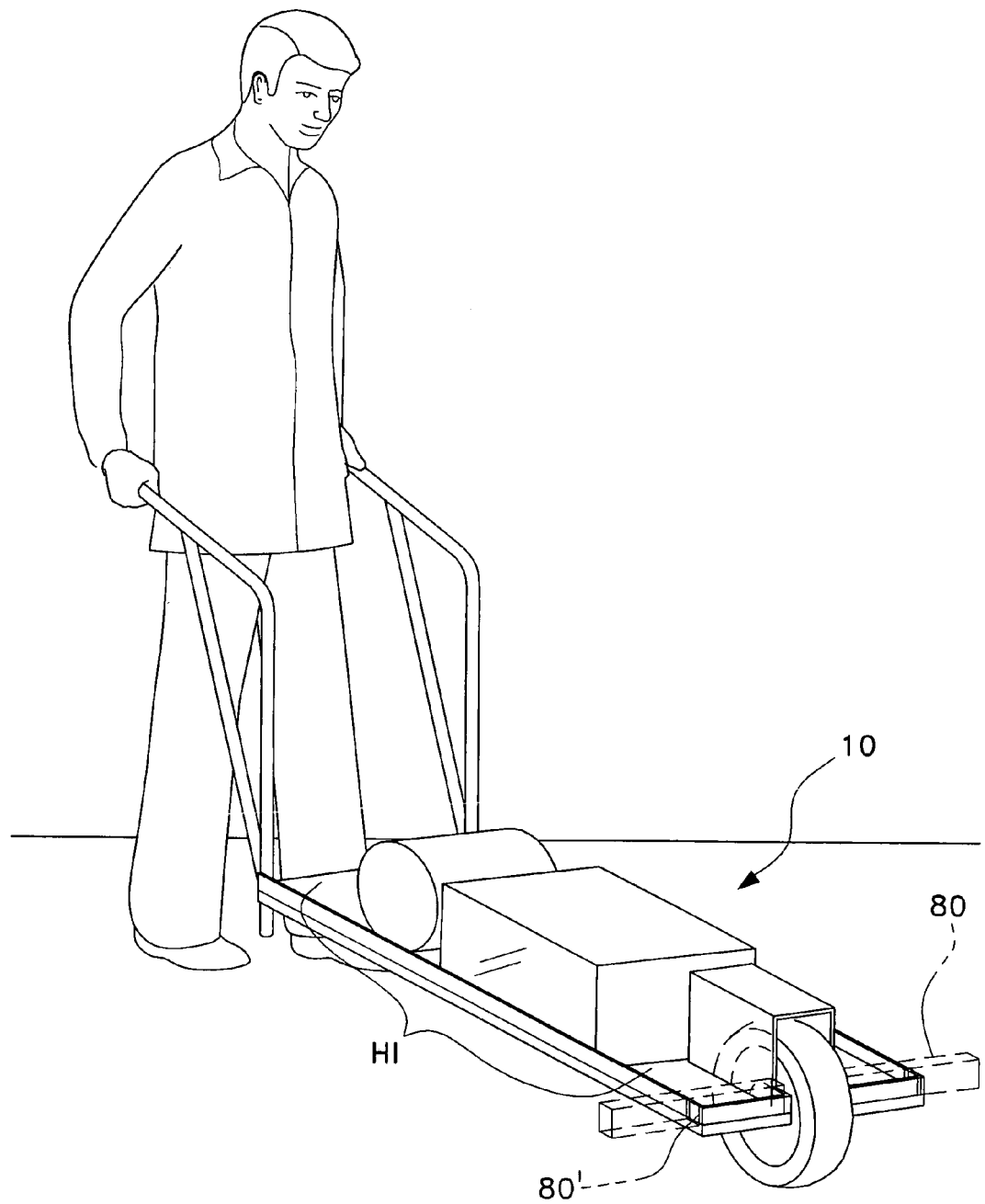
FIG. 1 is an environmental, perspective view of a device to move heavy items according to the present invention.

The present invention is a device to move heavy items 10 as is depicted in FIG. 1.

The device to move heavy items 10 comprises a substantially flat rectangular body 20 used to carry heavy items HI, a handle assembly 30 with two handles 32 perpendicularly attached to an H-shaped handle stand 34 that is perpendicularly attached to the proximal end 22 of the substantially flat rectangular body 20, a sling 40 provided on each handle 32 of the handle assembly 30 to hold long and awkward items extending from the substantially flat rectangular body 20, a wheel 50 positioned at the distal end 24 and center of the substantially flat rectangular body 20 to facilitate movement of the device to move heavy items 10 and a cowl 60 above and around the wheel 50, having an open front 62 to allow the wheel 50 to extend beyond the cowl 60 and the substantially flat rectangular body 20. These features are depicted in FIG. 2 and FIG. 3.

Figure 2:
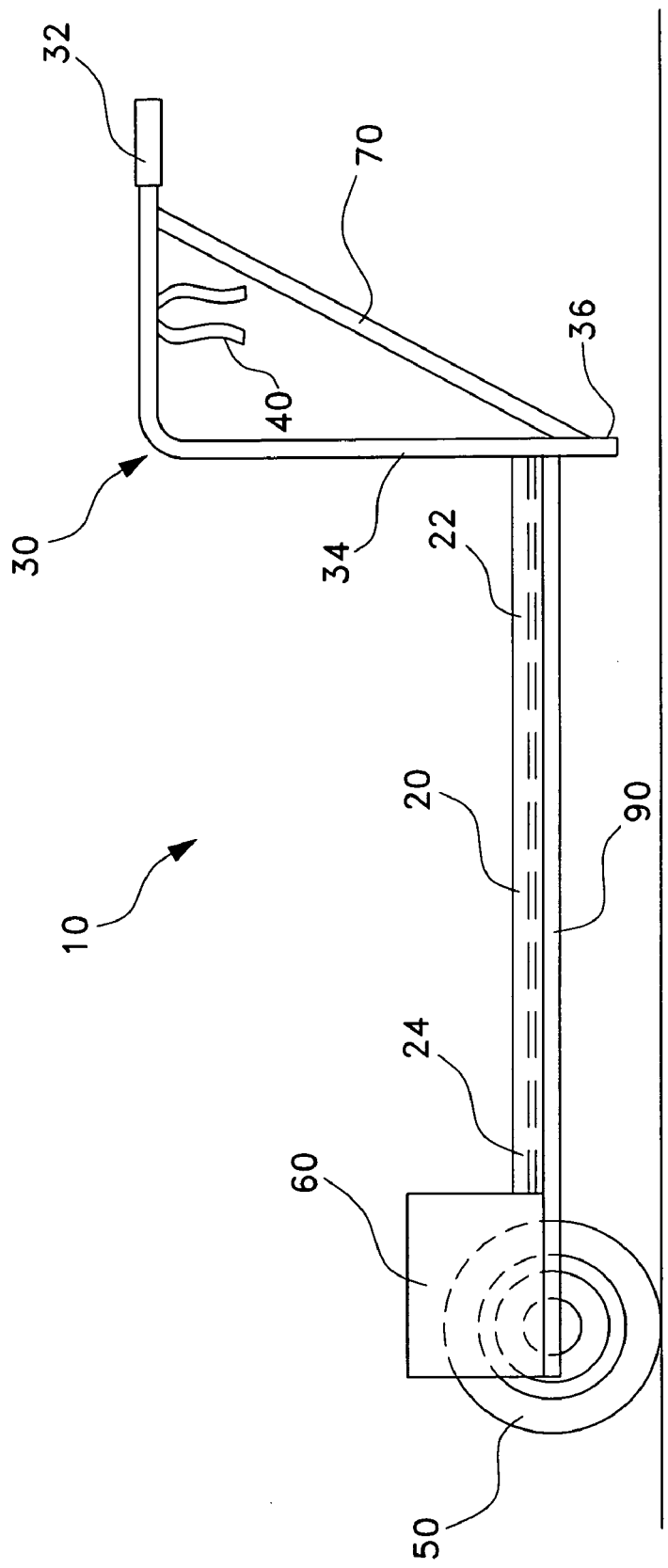
FIG. 2 is a side perspective view of a device to move heavy items.
Figure 3:
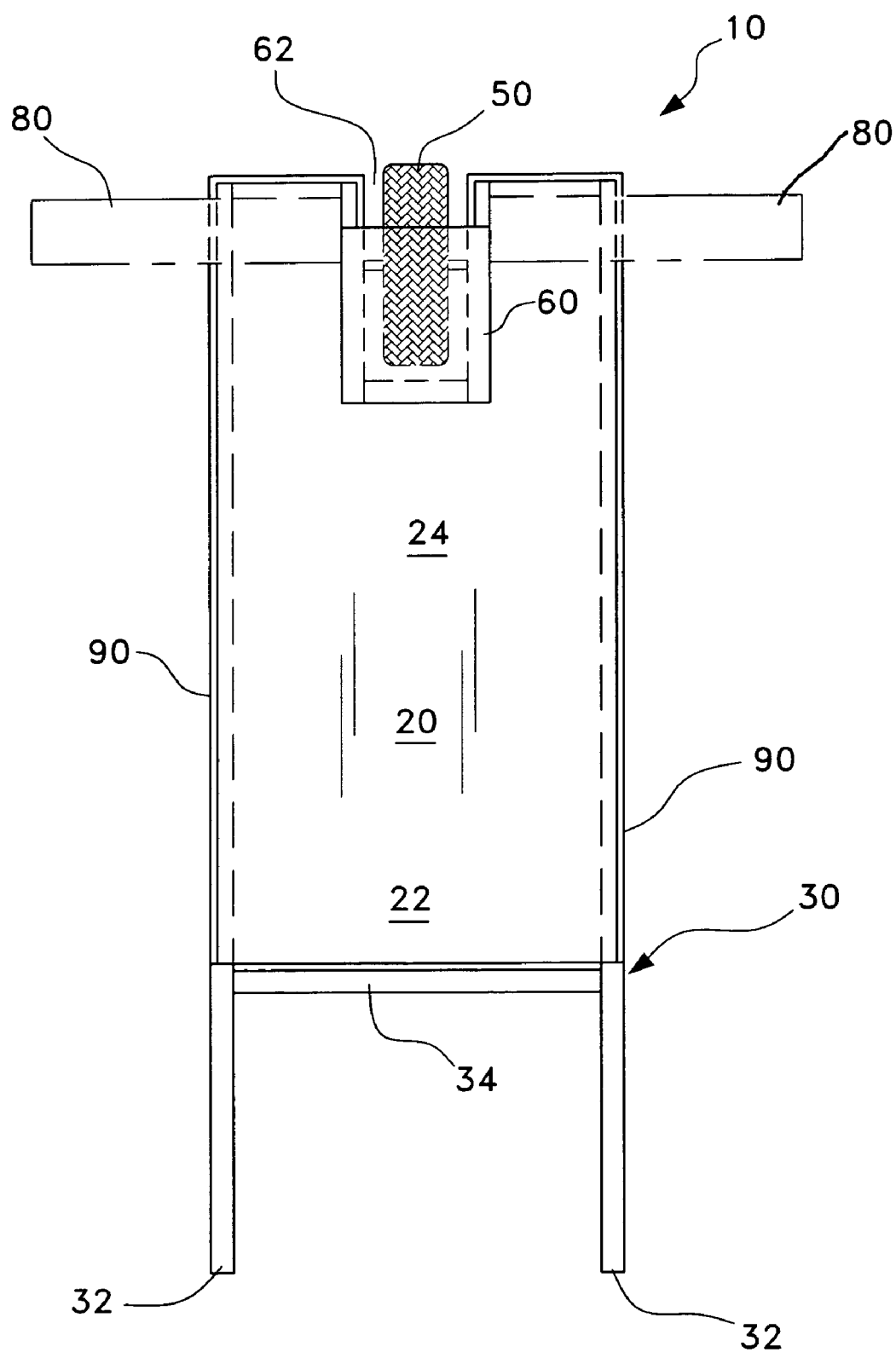
FIG. 3 is an overhead perspective view of a device to move heavy items.

As is also depicted in FIG. 2 and FIG. 3, there is a slight incline towards the distal end 24 of the device to move heavy items 10 to assure that the feet 36 at the proximal end 22 do not drag while the device to move heavy items 10 is being operated. The feet 36 make an excellent brake when needed, carrying a heavy load down an incline. When a nearly perfect level of the substantially flat rectangular body 20 is desirable, the feet 36 could be placed on a 3" board (not shown) while loading the device to move heavy items 10 depending on the immediate terrain features.

The device to move heavy items 10 can be tilted to either side for easy loading. This can enable a user, for example, to roll a heavy rock or barrel and be tilt-rolled onto the tilted substantially flat rectangular body 20. The wheel 50 also leads the forward edge of the device to move heavy items 10 by 2"–3" (FIG. 3), which allows the device to move heavy items 10 to negotiate uneven and rough pathways that a user could encounter on a construction site or a mountain range. The device to move heavy items 10 also has a low center of gravity, which makes it easy to handle and convey heavy items HI without concern or exertion in keeping the heavy items HI balanced and under control. The balance of heavy items HI can be placed close to the distal end 24 and the wheel 50 so that the wheel 50 carries most of or all of the weight of the heavy items HI. This makes it possible for the device to move heavy items 10 to convey heavy items more easily than a conventional wheelbarrow.

The device to move heavy items 10 has a diagonal support bar 70 attached between the handles 32 and the H-shaped handle stand 34. The H-shaped handle stand 34 has feet 36 that extend downward towards the ground past the substantially flat rectangular body 20 but before the horizontal plane of the bottom of the wheel 50. The device to move heavy items 10 is constructed in such a way as to carry lengthy items such as lumber, pipes and rods using the slings 40 provided at each handle 32. The slings 40 are made of nylon or cloth and can be tied around the posterior portion of an elongated load to facilitate the transport of the elongated load. The device to move heavy items 10 has no front bumper, as do most conventional wheelbarrows, to facilitate the dumping of amorphous materials such as gravel or concrete mix. The absence of a bumper allows the device to move heavy items 10 to maneuver better than conventional wheelbarrows with front bumpers. The device to move heavy items 10 is not designed to transport amorphous material, but is designed to transport objects and containers. The device to move heavy items 10 contains a raised border 90 around the perimeter of the substantially flat rectangular body 20 to help prevent items and objects from slipping off of the device to move heavy items 10.

The device to move heavy items 10 has a substantially flat rectangular body 20, handle assembly 30 and cowl 60 that are made of lightweight steel. The wheel 50 is made of durable rubber and is 12" in diameter. The cowl 60 has approximately 1" clearance to the wheel 50 and also serves to protect the wheel 50 from contact with any transported heavy items HI. The substantially flat rectangular body 20 is 20"×22" with a 0.25" high border to keep items from slipping off. The 22" width is also narrow enough to allow the device to move heavy items 10 to fit through pedestrian doorways and hallways. The feet of the handle assembly 30 are 3" long from the intersection of the H-shaped handle stand 34 and the substantially flat rectangular body 20. The H-shaped handle stand 34 is 18" high from the intersection of the substantially flat rectangular body 20 and has a 14" long handle 32 for each hand that is perpendicular to the H-shaped handle stand 34. The total length of the device to move heavy items 10 is approximately 46" long and is 24" high. The feet 36 on the handle assembly are 3" from the substantially flat rectangular body 20.

As is shown in FIG. 3, two 14' horizontal bars 80 extending from the front of the cowl 60, one on each side, perpendicular to the longitudinal edge of the substantially flat rectangular body 20 on each side, provide a fulcrum for conveyance of long and awkward objects. Each of the two horizontal bars 80 has at least one groove 89' for fitting over and onto the raise border 90 provided around the front perimeter. The slightly raised line of these horizontal bars 80, as they extend from the base of the substantially flat rectangular body 20, helps hold the conveyed long and awkward objects toward the longitudinal center line of the device for moving heavy items 10.

It is to be understood that the present invention is not limited to the sole embodiment described above, but encompasses any and all embodiments within the scope of the following claims.

I claim:

1. A device to move heavy items, comprising:
   a substantially flat rectangular body with a distal end, a proximal end, and a center;
   wherein a raised border is provided around the perimeter of the substantially flat rectangular body;
   a handle assembly including an H-shaped handle stand having an upper end and a lower end, said H-shaped handle stand being perpendicularly attached to the proximal end of the substantially flat rectangular body adjacent to said lower end, and two handles extending perpendicularly from said H-shaped handle stand at said upper end;
   a sling provided on each one of said handles of said handle assembly, each said sling being designed and configured to hold long and awkward items extending from the substantially flat rectangular body;
   a wheel positioned at the distal end and the center of the substantially flat rectangular body to facilitate movement of the device;
   a cowl above and around the wheel, having an open front to allow the wheel to extend beyond the cowl and the substantially flat rectangular body allowing the device to be tilted for easy loading; and
   two horizontal bars disposed in front of the substantially flat rectangular body and adjacent to the cowl for easy carrying of the heavy items, wherein the two horizontal bars are provided with fitted grooves so that the two horizontal bars fit over and onto the raised border provided around the front perimeter of the substantially flat rectangular body.

2. The device according to claim 1, wherein the heavy items can be placed close to the distal end and the wheel so that the wheel carries most of or all of the weight of the heavy items.

3. The device according to claim 1, wherein a diagonal support bar is attached between the handles and the H-shaped handle stands.

4. The device according to claim 1, wherein the H-shaped handle stand has feet that extend downwards of the substantially flat rectangular body.

5. The device according to claim 1, wherein each one of the slings are made of nylon.

6. The device according to claim 1, wherein each one of the slings are made of cloth.

7. The device according to claim 1, wherein the substantially flat rectangular body, the handle assembly and the cowl are made of lightweight steel.

8. The device according to claim 1, wherein the wheel is made of durable rubber.

* * * * *